United States Patent [19]

Tanabe et al.

[11] Patent Number: 5,054,935
[45] Date of Patent: Oct. 8, 1991

[54] TEMPERATURE-MEASURING METHOD AND DISTRIBUTED OPTICAL FIBER TEMPERATURE SENSOR

[75] Inventors: Yuzuru Tanabe, Yokohama; Koji Ikawa, Tokyo, both of Japan

[73] Assignee: Asahi Glass Company, Ltd., Tokyo, Japan

[21] Appl. No.: 534,233

[22] Filed: Jun. 7, 1990

[30] Foreign Application Priority Data

Jun. 8, 1989 [JP] Japan ................. 1-143996

[51] Int. Cl.$^5$ .................. G01K 11/00; G01J 5/08; G01J 5/10
[52] U.S. Cl. .................... 374/131; 374/161; 374/129; 356/44; 356/301; 250/227.14
[58] Field of Search ............. 374/131, 134, 127, 129, 374/161; 356/44, 301; 250/227.14; 350/96.29

[56] References Cited

U.S. PATENT DOCUMENTS

| | | | |
|---|---|---|---|
| 4,367,040 | 1/1983 | Goto | 356/44 |
| 4,508,461 | 4/1985 | Lambert | 374/161 |
| 4,673,299 | 6/1987 | Dakin | 374/131 |
| 4,714,829 | 12/1987 | Hartog et al. | 374/161 |
| 4,767,219 | 8/1988 | Bibby | 374/131 |
| 4,804,264 | 2/1989 | Kirchhofer et al. | 356/44 |
| 4,823,166 | 4/1989 | Hartog et al. | 374/131 |

FOREIGN PATENT DOCUMENTS

| | | | |
|---|---|---|---|
| 2122337 | 1/1984 | United Kingdom | 374/161 |
| 2140554 | 11/1984 | United Kingdom | 374/161 |
| 2181830 | 4/1987 | United Kingdom | 374/161 |
| 2183821 | 6/1987 | United Kingdom | 374/161 |

OTHER PUBLICATIONS

"Temperature Distribution Measurement Using Raman Ratio Thermometry", SPIE vol. 566, Fiber Optic & Laser III, (1985), pp. 249-256.

Primary Examiner—William A. Cuchlinski, Jr.
Assistant Examiner—Diego F. F. Gutierrez
Attorney, Agent, or Firm—Oblon, Spivak, McClelland, Maier & Neustadt

[57] ABSTRACT

A temperature-measuring method which comprises inputting laser pulses into an optical fiber to be measured and measuring the temperature distribution in the fiber from the ratio of the amplitudes and the delay time of the Stokes light and the anti-Stokes light contained in the return beam from the optical fiber, wherein the temperature distribution is measured by using an equation:

$$\frac{1}{T(x)} = \frac{1}{\Theta} - \frac{k}{hc\nu} \ln\left[\frac{R'(T)}{R'(\Theta)} \exp\left[\int_0^x \alpha\{T(\tau)\}d\tau\right]\right]$$

where $T(x)$ is the temperature to be measured, $\Theta$ is the reference temperature, $R'(T)$ is the relative ratio of amplitude to the measuring point, $R'(\Theta)$ is the relative ratio of amplitude at the reference temperature point, k is the Boltzmann's constant, h is the Planck's constant, c is the velocity of light, $\nu$ is the Raman shift, $\alpha$ is the attenuation difference in the optical fiber between the Stokes light and the anti-Stokes light, and x is the distance, wherein the attenuation differenct $\alpha$ is represented by a function $\alpha\{T(\tau)\}$ which is dependent on the temperature $T(\tau)$ at the measuring point $\tau$, and the exponential function in which the exponential part is represented by a value obtained by integrating the function $\alpha\{T(\tau)\}$ with the variation $d\tau$ in distance, is employed as a correction factor.

4 Claims, 4 Drawing Sheets

TEMPERATURE-MEASURING METHOD AND DISTRIBUTED OPTICAL FIBER TEMPERATURE SENSOR

BACKGROUND OF THE INVENTION

The present invention relates to a temperature-measuring method employing a distributed optical fiber temperature sensor. More particularly, it relates to a distributed optical fiber temperature sensor and a temperature-measuring method, whereby the influence of the attenuation difference in the optical fiber to be measured, which creates a problem when the ratio of the Stokes light and the anti-Stokes light is taken, is corrected so that the temperature distribution in a long distance optical fiber can be measured with high precision.

A block diagram of a conventional distributed optical fiber temperature sensor is shown in FIG. 5. Laser pulses, generated from a laser pulser 10 of a light source, are input into an optical fiber 12 to be measured, and Raman back scattered light generated in the optical fiber 12 is returned to the incident end. Such Raman back scattered light will be introduced by an optical directional coupler 11 to a measuring apparatus, whereby the Stokes light and the anti-Stokes light in the Raman back scattered light are separated by a filter 13, detected, and converted, respectively, to electrical signals in proportion to their associated amplitudes by the respective photo-electric converters 14 and 14'. Such electrical signals are amplified by the respective preamplifiers 15 and 15' and subjected to a prescribed number of averaging treatment operations by an averager 16. The resulting average-treated signal is transmitted to a signal processing unit 17, whereby the delay time and the ratio of the amplitudes of the Stokes light and the anti-Stokes light are calculated, and the temperature distribution is output.

In the calculation of the ratio of the amplitudes of the Stokes light and the anti-Stokes light, it is difficult to obtain the ratio of the absolute amplitudes. Therefore, the ratio of the amplitudes of the stokes and anti-stokes light is obtained from the ratio of the relative amplitudes (hereinafter sometimes referred to as "the relative ratio of amplitudes") by the following equation by Dakin (Dakin, J. P. Pratt, D. J., Bibby, G. W., Ross, J. N. "Temperature distribution measurement using Raman ratio thermometry", SPIE Vol 566, Fiber Optic and Laser Sensors III 249 (1985)):

$$\frac{1}{T} = \frac{1}{\Theta} - \frac{k}{hc\nu} \ln[R'(T)/R'(\Theta)] \quad (1)$$

In the above equation, T is the temperature to be measured, $\Theta$ is the reference temperature at a reference measuring point, R'(T) is the relative ratio of amplitudes at the measuring point, R'($\Theta$) is the relative ratio of amplitudes at the reference temperature point, k is the Boltzmann's constant, h is the Planck's constant, c is the velocity of light, and $\nu$ is the Raman shift.

The incident laser pulses from the light source, such as a semiconductor laser, naturally undergo attenuation during transmission through the optical fiber to be measured. The influence of this attenuation can be avoided by taking the ratio of the Stokes light and the anti-Stokes light. However, the influence of the attenuation difference between the Stokes light and the anti-Stokes light, when the Raman scattering is generated by the incident wave and the scattered light is transmitted backwards, can not be avoided simply by taking the ratio. Therefore, a correction is required which takes the influence of this attenuation difference into consideration. If such a correction is not conducted, even if a uniform temperature distribution is measured, a substantially inclined temperature distribution will be output as shown in FIG. 4. Further, the attenuation difference itself has a temperature dependency, and the influence of the temperature dependency will be substantial in the case of a measurement taken over a long distance. As a result, accurate measurement with a high precision has been difficult to obtain.

SUMMARY OF THE INVENTION

The present invention has been made to solve the above mentioned problems. According to a first embodiment, the present invention provides a temperature-measuring method which comprises inputting laser pulses into an optical fiber to be measured and measuring the temperature distribution in the fiber from the ratio of the amplitudes and the delay time of the Stokes light and the anti-Stokes light contained in a return beam emitted from the optical fiber. The temperature distribution is measured by using an equation:

$$\frac{1}{T(x)} = \frac{1}{\Theta} - \frac{k}{hc\nu} \ln \left[ \frac{R'(T)}{R'(\Theta)} \exp \left[ \int_0^x \alpha\{T(\tau)\}d\tau \right] \right]$$

wherein T(x) is the temperature to be measured, $\Theta$ is the reference temperature, R'(T) is the relative ratio of amplitudes at the measuring point, R'($\Theta$) is the relative ratio of amplitudes at the reference temperature point, k is the Boltzmann's constant, h is the Planck's constant, c is the velocity of light, $\nu$ is the Raman shift, $\alpha$ is the attenuation difference in the optical fiber between the Stokes light and the anti-Stokes light, and x is the distance. In the equation, the attenuation difference $\alpha$ is represented by a function $\alpha\{T(\tau)\}$ which is dependent on the temperature T($\tau$) at the measuring point $\tau$, and the exponential function, in which the exponential part is represented by a value obtained by integrating the function $\alpha\{T(\tau)\}$ with the variation d$\tau$ in distance, is employed as a correction factor.

According to a second embodiment, the present invention provides a temperature-measuring method which comprises inputting laser pulses into an optical fiber to be measured, and measuring the temperature distribution in the optical fiber from the ratio of the amplitudes and the delay time of the Stokes light and the anti-Stokes light contained in the return beam from the optical fiber. The temperature distribution is measured by using first and second correction equations as set forth below.

First correction equation $$\frac{1}{T(x)} = \frac{1}{\Theta} - \frac{k}{hc\nu} \ln \left( \frac{R'(T)}{R'(\Theta)} e^{\mu a x} \right)$$

In the first correction equation, T(x) is the temperature to be measured, $\Theta$ is the reference temperature, R'(T) is the relative ratio of amplitudes at the measuring point, R'($\Theta$) is the relative ratio of amplitudes at the reference temperature point, k is the Boltzmann's constant, h is the Planck's constant, c is the velocity of light, $\nu$ is the Raman shift, $\alpha$ is the attenuation difference in the optical fiber between the Stokes light and the anti-Stokes light, x is the distance, and u is a real number of at least 0, wherein the attenuation difference $\alpha$ is represented by a constant value, and the exponential function, in which the exponential part is the product of the attenuation difference $\alpha$ and the distance x, is employed as a correction factor.

Second correction equation $$\frac{1}{T(x)} = \frac{1}{\Theta} - \frac{k}{hc\nu} \ln \left[ \frac{R'(T)}{R'(\Theta)} \exp \left[ \int_0^x \alpha\{T(\tau)\} d\tau \right] \right]$$

In the second correction equation, $T(x)$, $\Theta$, $R'(T)$, $R'(\Theta)$, k, h, c, $\nu$, $\alpha$ and x are as defined above with respect to the first correction equation, wherein the attenuation difference $\alpha$ is represented by a function $\alpha\{T(\tau)\}$ which is dependent on the temperature $T(\tau)$ at the measuring point $\tau$, and the exponential function, in which the exponential part is represented by a value obtained by integrating the function $\alpha\{T(\tau)\}$ with the variation $d\tau$ in distance, is employed as a correction factor. In this second embodiment, the temperature distribution $[T_n^0]$, (wherein n is an integer of at least 1) obtained by the first correction equation, is substituted into the exponential part of the second correction equation, to obtain temperature distribution $[T_n^1]$. Subsequently, temperature distribution $[T_n^r]$, (wherein r is an integer of at least 1) obtained immediately before, is successively substituted into the second correction equation, to obtain temperature distribution $[T_n^{r+1}]$ at $r+1$ times. As a result, the temperature distribution $[T_n^r]$, obtained when the error $$\epsilon = \sqrt{\sum_{n=1}^{m} (T_n^r - T_n^{r-1})^2}$$

(wherein m is the number of the measuring points) becomes not higher than a predetermined value at r times, is taken as the measured value.

According to a third embodiment, the present invention provides a distributed optical fiber temperature sensor which comprises a light source which inputs laser pulses into an optical fiber to be measured, an optical directional coupler which introduces the return beam from the optical fiber to a signal processing unit, and a signal processing unit which detects the Stokes light and the anti-Stokes light contained in the return beam and which measures the temperature distribution in the optical fiber from the ratio of the amplitudes and the delay time of the Stokes light and the anti-Stokes light. In this third embodiment, the signal processing unit measures the temperature distribution by using an equation:

$$\frac{1}{T(x)} = \frac{1}{\Theta} - \frac{k}{hc\nu} \ln \left[ \frac{R'(T)}{R'(\Theta)} \exp \left[ \int_0^x \alpha\{T(\tau)\} d\tau \right] \right]$$

wherein $T(x)$ is the temperature to be measured, $\Theta$ is the reference temperature, $R'(T)$ is the relative ratio of amplitudes at the measuring point, $R'(\Theta)$ is the relative ratio of amplitudes at the reference temperature point, k is the Boltzmann's constant, h is the Planck's constant, c is the velocity of light, $\nu$ is the Raman shift, $\alpha$ is the attenuation difference in the optical fiber between the Stokes light and the anti-Stokes light, and x is the distance.

According to a fourth embodiment, the present invention provides a distributed optical fiber temperature sensor which comprises a light source which inputs laser pulses into an optical fiber to be measured, an optical directional coupler which introduces the return beam from the optical fiber to a signal processing unit, and a signal processing unit which detects the Stokes light and the anti-Stokes light contained in the return beam and which measures the temperature distribution in the optical fiber from the ratio of the amplitudes and the delay time of the Stokes light and the anti-Stokes light. In this fourth embodiment, the signal processing unit measures the temperature distribution by using first and second correction equations as set forth below.

First correction equation $$\frac{1}{T(x)} = \frac{1}{\Theta} - \frac{k}{hc\nu} \ln \left( \frac{R'(T)}{R'(\Theta)} e^{u\alpha x} \right)$$

In this first correction equation, $T(x)$ is the temperature to be measured, $\Theta$ is the reference temperature, $R'(T)$ is the relative ratio of amplitudes at the measuring point, $R'(\Theta)$ is the relative ratio of amplitudes at the reference temperature point, k is the Boltzmann's constant, h is the Planck's constant, c is the velocity of light, $\nu$ is the Raman shift, $\alpha$ is the attenuation difference in the optical fiber between the Stokes light and the anti-Stokes light, x is the distance, and u is a real number of at least 0, wherein the attenuation difference $\alpha$ is represented by a constant value, and the exponential function, in which the exponential part is the product of the attenuation difference $\alpha$ and the distance x, is employed as a correction factor.

Second correction equation $$\frac{1}{T(x)} = \frac{1}{\Theta} - \frac{k}{hc\nu} \ln \left[ \frac{R'(T)}{R'(\Theta)} \exp \left[ \int_0^x \alpha\{T(\tau)\} d\tau \right] \right]$$

In the second correction equation, $R(x)$, $\Theta$, $R'(T)$, $R'(\Theta)$, k, h, c, $\nu$, $\alpha$ and x are as defined above, with respect to the first correction equation, the attenuation difference $\alpha$ is represented by a function $\alpha\{T(\tau)\}$ which is dependent on the temperature $T(\tau)$ at the measuring point $\tau$, and the exponential function, in which the exponential part is represented by a value obtained by integrating the function $\alpha\{T(\tau)\}$ with the variation $d\tau$ in distance, is employed as a correction factor. In this fourth embodiment, the temperature distribution $[T_n^0]$ (wherein n is an integer of at least 1), obtained by the first correction equation, is substituted into the exponential part of the second correction equation, to obtain temperature distribution $[T_n^1]$. Subsequently, temperature distribution $[T_n^r]$ (wherein r is an integer of at least 1) obtained immediately before is successively substituted into the second correction equation, to obtain temperature distribution $[T_n^{r+1}]$ at $r+1$ times, and temperature distribution $[T_n^r]$ obtained, when the error $$\frac{1}{T(x)} = \frac{1}{\Theta} - \frac{k}{hcv} \ln \left[ \frac{R'(T)}{R'(\Theta)} \exp \left[ \int_0^x \alpha\{T(\tau)\} d\tau \right] \right]$$

(wherein m is the number of the measuring points), becomes not higher than a predetermined value at r times, is taken as the measured value.

BRIEF DESCRIPTION OF THE DRAWINGS

In the accompanying drawings.

DETAILED DESCRIPTION OF THE PREFERRED EMBODIMENTS

Figure 1A:
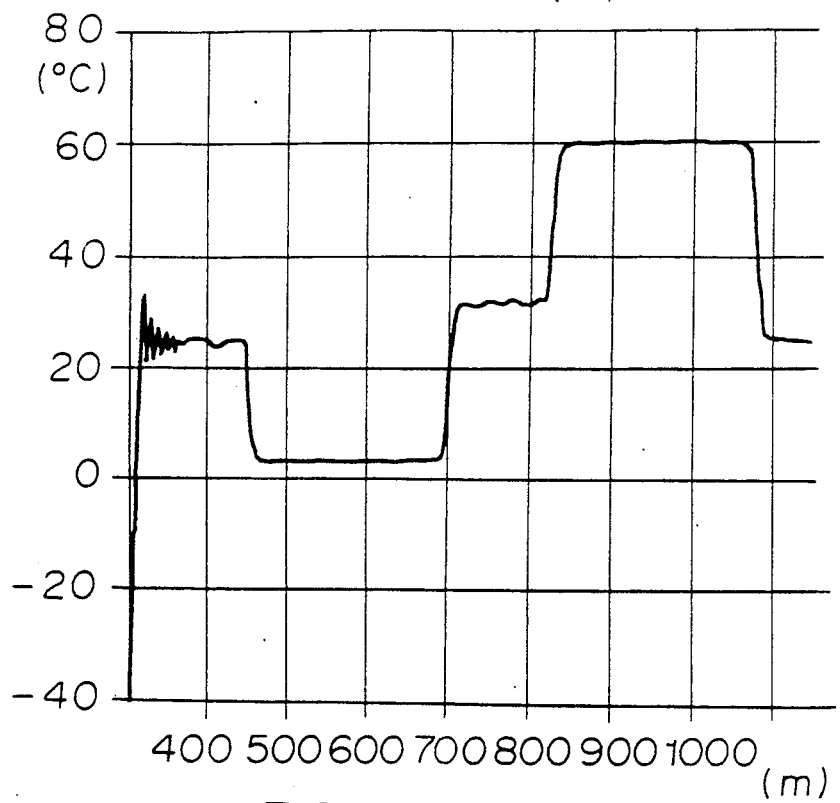
FIGS. 1a, b to 3a, b are graphs showing the results of the measurements conducted by the method and the sensor of the present invention.

Now, the present invention will be described in detail with reference to the preferred embodiments.

In the first and third embodiments of the present invention, the exponential function of the correction factor is determined by the following procedure.

For instance, 1 km of an optical fiber to be measured is divided into 100 measuring points with an interval of every 10 m. At the first measuring point $x=1$, the temperature $T(1)$ is calculated by the equation containing no correction factor. The temperature $T(2)$, at the second measuring point $x=2$, can be obtained approximately by introducing the attenuation difference $\alpha\{T(1)\}$ obtained from the temperature measured at the first measuring point into the correction factor, since the error is negligible. Further, the temperature $T(3)$, at the third measuring point $x=3$, can likewise be obtained by introducing the attenuation difference $\alpha\{T(1)\}$ at the first measuring point and the attenuation difference $\alpha\{T(2)\}$ at the second measuring point into the correction factor. Accordingly, the correction factor $C_n$ at the nth measuring point (where n is an integer of at least 1) i.e. at an optional distance x, is obtained by:

$$C_n = \prod_{m=1}^{n-1} \exp[\alpha\{T(\tau m)\}\Delta \tau]; \quad (2)$$

$$= \exp\left[\sum_{m=1}^{n-1} \alpha\{T(\tau m)\}\Delta \tau\right]; \text{ and} \quad (3)$$

$$= \exp\left[\int_0^x \alpha\{T(\tau)\} d\tau\right]. \quad (4)$$

In this case, data of attenuation difference $\alpha$ in a temperature range of from about 0° C. to about 100° C. to which the sensor of the present invention will be applied, are memorized or stored by the signal processing unit prior to the measurement of the temperature distribution and will be used for the measurement. Here, the attenuation difference $\alpha$ is determined by the following procedure. When the temperature of the entire optical fiber is constant, the amplitude signals $I_{AS}(x)$ of the anti-Stokes light is represented by the following equation:

$$I_{AS}(x) = A(T) \cdot e^{-a(T) \cdot x}; \quad (5)$$

where x is the distance, a(T) is the attenuation of the anti-Stokes light at a temperature T, and A(T) is a function which is dependent on the temperature. When natural logarithm is applied to both sides of the above equation, the following equation (6) will be obtained:

$$\ln I_{AS}(x) = \ln A(T) - a(T) \cdot x \quad (6)$$

Here, if the temperature T is constant against x, i.e., if the temperature is constant over the entire optical fiber, equation (6) will be a linear line with a slope of a(T) with lnA(T) being intercept. Accordingly, by changing the temperature T to various values and conducting the above treatment, the slopes a(T) at various temperatures can be obtained. The attenuation b(T) of the Stokes light can be obtained in a similar manner. Accordingly, the attenuation difference $\alpha(T)$ at a temperature T will be obtained by the following equation:

$$\alpha(T) = b(T) - a(T)(m^{-1}). \quad (7)$$

Further, as a result of extensive research, the present inventors have found that $\alpha(T)$ can be approximated by a quadric curve relating to the temperature T, and $\alpha(T)$ can be memorized as a quadric function of T, which can in turn be used for the calculation of the correction factor $C_n$. Further, $\alpha(T)$ may vary slightly depending upon the type of the optical fiber used, and in such a case, $\alpha(T)$ may be determined for each type of such optical fiber.

Now, the second and fourth embodiments of the present invention will be described.

Firstly, the following treatment is conducted by setting $u=0$ or 1 in the first correction equation. However, the case where $u=1$ is preferred, since the measurement can thereby be conducted with high precision. In the case of $u=1$, the attenuation difference $\alpha$ is substituted as a constant value corresponding to a certain temperature within a temperature range of from about 0° C. to about 100° C. in which the sensor of the present invention will be applied. In this case, if an optical fiber of 1,000 m is divided into 1,000 measuring points, spaced every 1 m, the temperature distribution $]T_n^0]$ (wherein n is an integer of $1 \leq n \leq 1,000$) is obtained with respect to the 1,000 measuring points. Also, in the case of $u=0$, $[T_n^0]$ is obtained in a similar manner. Then, the above temperature distribution is substituted into the exponential part of the second correction equation, i.e., by using the above equation (3), calculation, by the following equation (8):

$$\frac{1}{T_n^1} = \frac{1}{\Theta} - \frac{k}{hcv} \ln \left( \frac{R'(T)}{R'(\Theta)} \exp \left[ \sum_{m=1}^{n} \alpha\{T(\tau_m)\}\Delta \tau \right] \right) \quad (8)$$

is conducted with respect to $n=1$ to 1,000. The result is represented by $[T_n^1]$ ($1 \leq n \leq 1,000$). In equation (8), the sum of up to n terms is taken to increase the precision. Next, the error $\epsilon$ is obtained by the following equation:

$$\epsilon = \sqrt{\sum_{n=1}^{1000} (T_n^1 - T_n^0)^2}. \quad (9)$$

If the error $\epsilon$ is larger than the prescribed value e.g. 3, $[T_n^1]$ is further substituted into the second correction equation to obtain $[T_n^2]$ ($1 \leq n \leq 1,000$). This operation will then be repeated until the error $\epsilon$ becomes not higher than the prescribed value, and the temperature distribution $[T_n^r]$, when the error $\epsilon$ becomes not higher than the prescribed value, is taken as the measured value. This operation may be represented by the following equation (10):

$$[T_n^r] = f[T_n^{r-1}]; \qquad (10)$$

where $f[T_n^{r-1}]$ is the operation of substituting the previous temperature distribution $[T_n^{r-1}]$ into the exponential part of the right side of the second correction equation. Namely, the results of the left side are sequentially substituted into the right side, and the error $\epsilon$ is determined until the desired value is obtained. In the foregoing instance, the measuring points are taken every 1 m, but the measurement may be conducted for every 10 m or other length. Further, in this case, the attenuation difference $\alpha$ of the exponential part of the second correction equation is taken in consideration of the temperature dependency, and its data are memorized or stored by the signal processing unit prior to the measurement of the temperature distribution or they are memorized or stored in the form of a quadric function of the temperature T, and will be used for the measurement of the temperature distribution.

In the present invention, a correction factor, based on the attenuation reference $\alpha$ of the Stokes light and the anti-Stokes light, is introduced into the Dakin equation used for the measurement of the temperature distribution in the optical fiber, and the correction equation taking the temperature dependency of the attenuation difference $\alpha$ into consideration is used, whereby in the temperature distribution measurement of an optical fiber of a long distance, the problem that the temperature distribution curve inclines substantially due to the distance, can be solved, and the measurement can be conducted with high precision.

Now, the present invention will be described in further detail with reference to the following Examples. However, it should be understood that the present invention is by no means restricted to such specific Examples.

EXAMPLES

Figure 1B:
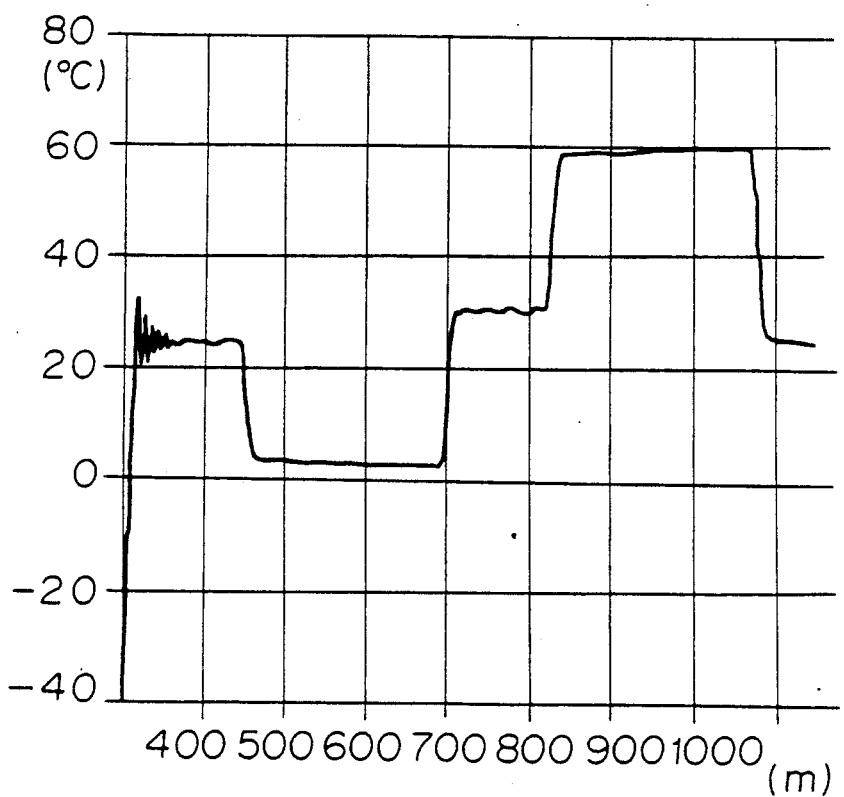
Figure 2:
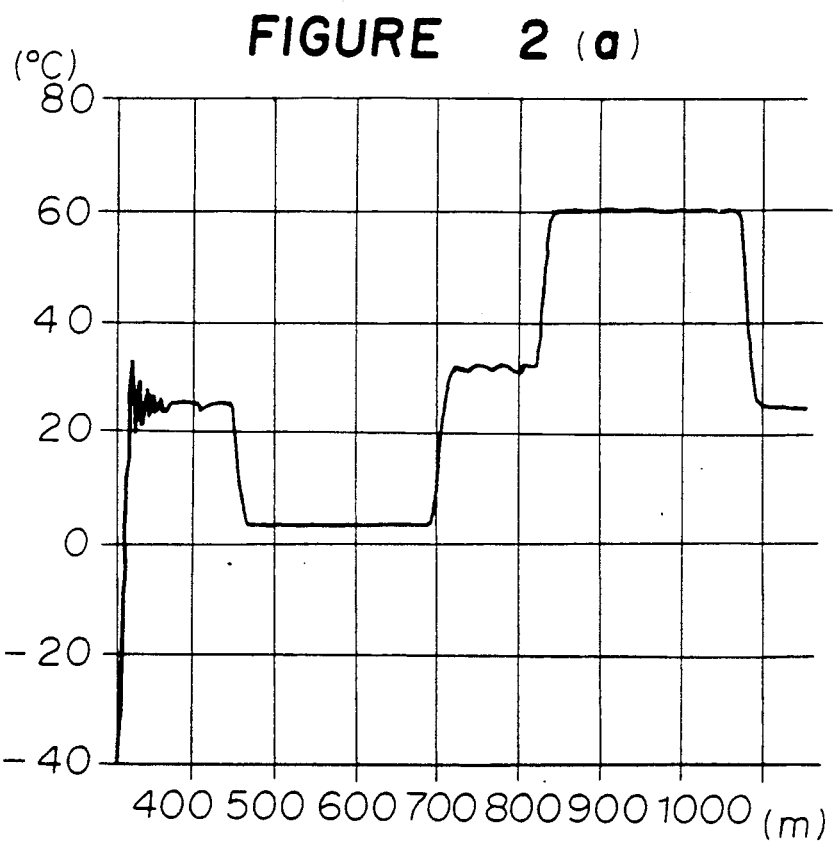
Figure 2:
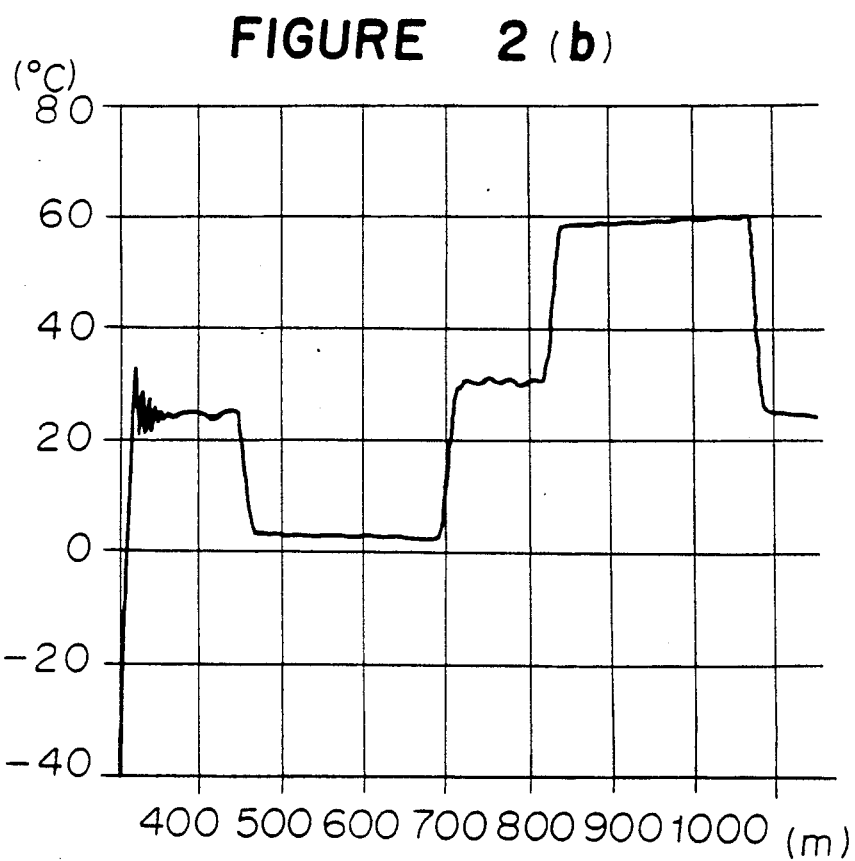

FIGS. 1 to 3 illustrate the Examples of the present invention.

FIG. 1(a) is a graph showing the temperature distribution obtained by using the correction equation:

$$\frac{1}{T(x)} = \frac{1}{\Theta} - \frac{k}{hcv} \ln\left( \frac{R'(T)}{R'(\Theta)} \exp\left[ \int_0^x \alpha\{T(r)\} dr \right] \right).$$

Figure 4:
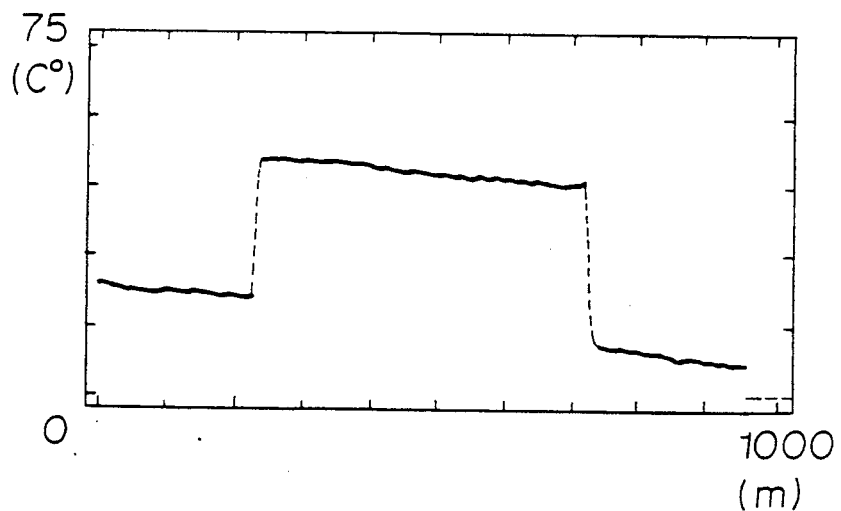
FIG. 4 is a graph showing the results of measurement conducted by a conventional method.

FIG. 1(b) is a graph of a Reference Example wherein $\alpha$ is a constant value, and the exponential part is simply represented by $\alpha x$. In FIG. 1(a), the temperature distribution is not substantially inclined as compared with the conventional instance of FIG. 4, and the precision is substantially improved over the case of FIG. 1(b).

In this Example, an optical fiber of 1,000 m was measured at measuring points set every 1 m.

FIG. 2(a) is a graph showing the temperature distribution obtained by the convergent method employing the first correction equation (u=1) having $\alpha x$ introduced into the exponential part and the second correction equation, and it shows the results up to the second treatment i.e., $[T_n^2]$. FIG. 2(b) is a graph of a Reference Example wherein $\alpha$ is a constant value, and the exponential part is simply represented by $\alpha x$. In FIG. 2(a), the temperature distribution is not substantially inclined as compared with the conventional instance of FIG. 4, and the precision thereof is substantially improved over FIG. 2(b). In this Example, an optical fiber of 1,000 m was measured at measuring points of every 1 m. In this Example, errors $\epsilon_1$ to $\epsilon_6$ obtained by the operations of 6 times are as follows:

$$\epsilon_1 = \sqrt{\sum_{n=1}^{1000} (T_n^1 - T_n^0)^2} = 26.7;$$

$$\epsilon_2 = \sqrt{\sum_{n=1}^{1000} (T_n^2 - T_n^1)^2} = 2.4;$$

$$\epsilon_3 = \sqrt{\sum_{n=1}^{1000} (T_n^3 - T_n^2)^2} = 0.13;$$

$$\epsilon_4 = \sqrt{\sum_{n=1}^{1000} (T_n^4 - T_n^3)^2} = 0.534 \times 10^{-2};$$

$$\epsilon_5 = \sqrt{\sum_{n=1}^{1000} (T_n^5 - T_n^4)^2} = 0.534 \times 10^{-3};$$

$$\epsilon_6 = \sqrt{\sum_{n=1}^{1000} (T_n^6 - T_n^5)^2} = 0.$$

FIG. 2(a) shows a case wherein the operation was terminated when the error became $\epsilon_2 \leq 3$. In the range of $\epsilon_3$ or below, no difference was visually observed when compared with the graph in the case of $\epsilon_2$. The prescribed value to be used for the judgment of the error $\epsilon$ is not limited to the above identified value 3 and may suitably be selected.

Figure 3A:
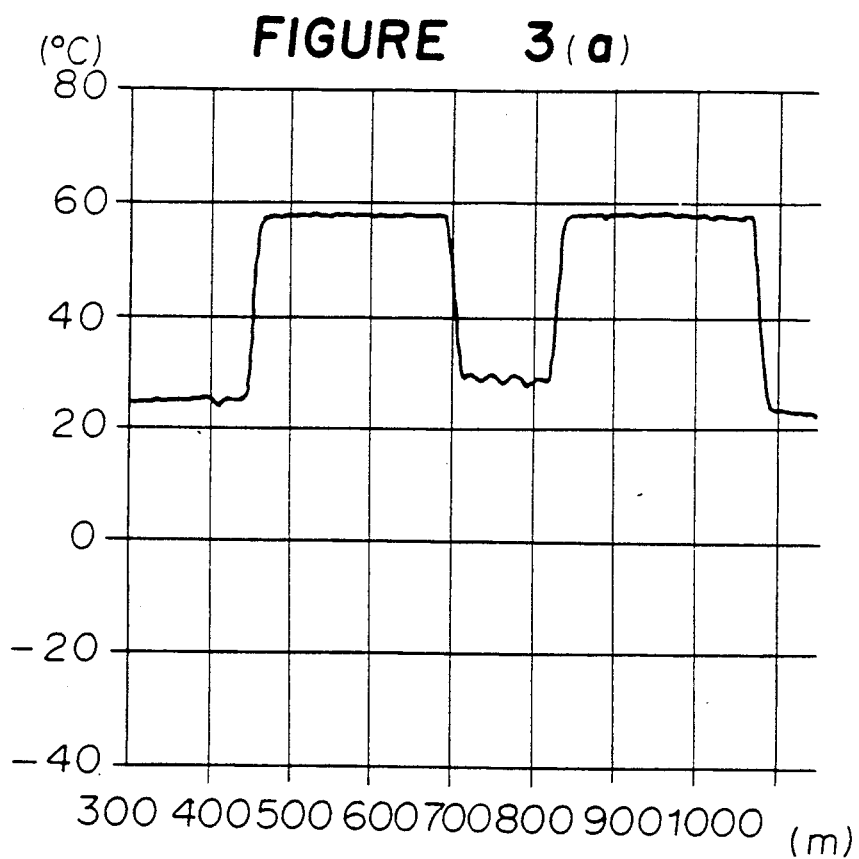
Figure 3B:
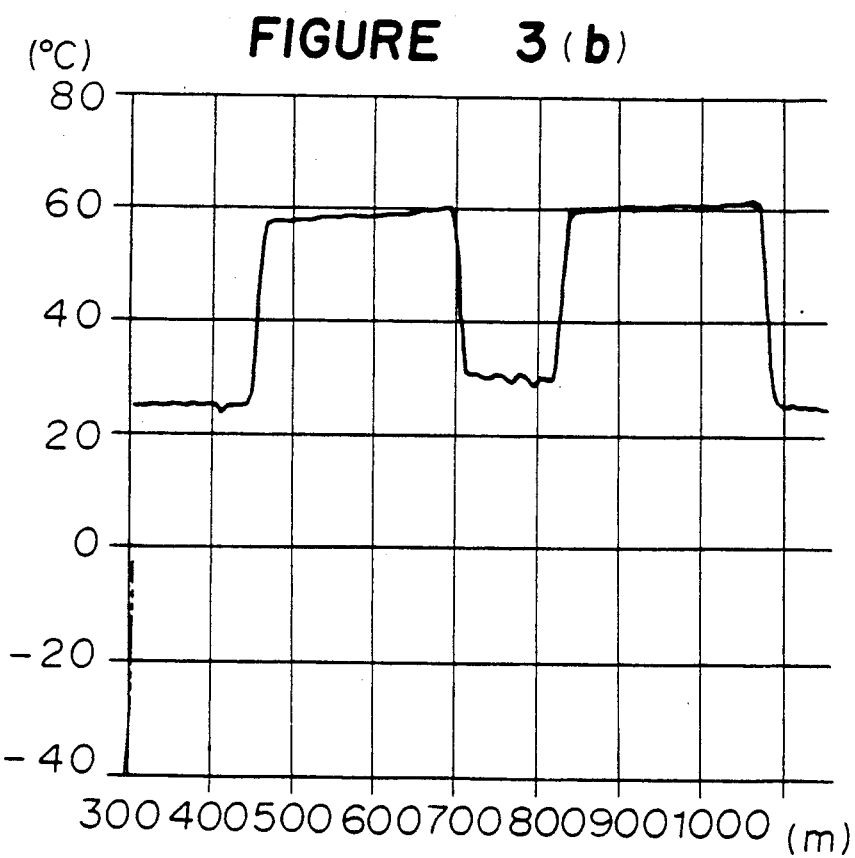

FIG. 3(a) is a graph showing the temperature distribution obtained by the convergent method employing the first correction equation (u=0) having no exponential part and the second correction equation, and represents the results up to the third treatment i.e., $[T_n^2]$. FIG. 3(b) is a graph of a Reference Example in which $\alpha$ is a constant value, and the exponential part is represented simply by $\alpha x$. In FIG. 3(a), the temperature distribution is not substantially inclined as compared with the conventional instance of FIG. 4, and the precision is substantially improved over FIG. 3(b). In this Example, an optical fiber of 1,000 was measured at measuring points of every 1 m. In this Example, the operation was terminated when the error become $\epsilon_3 \leq 3$, whereby the precision was slightly lower than the case of FIG. 2(a). The slightly lower precision is believed to be attributable to the fact that no exponential part was introduced into the first correction equation.

Figure 5:
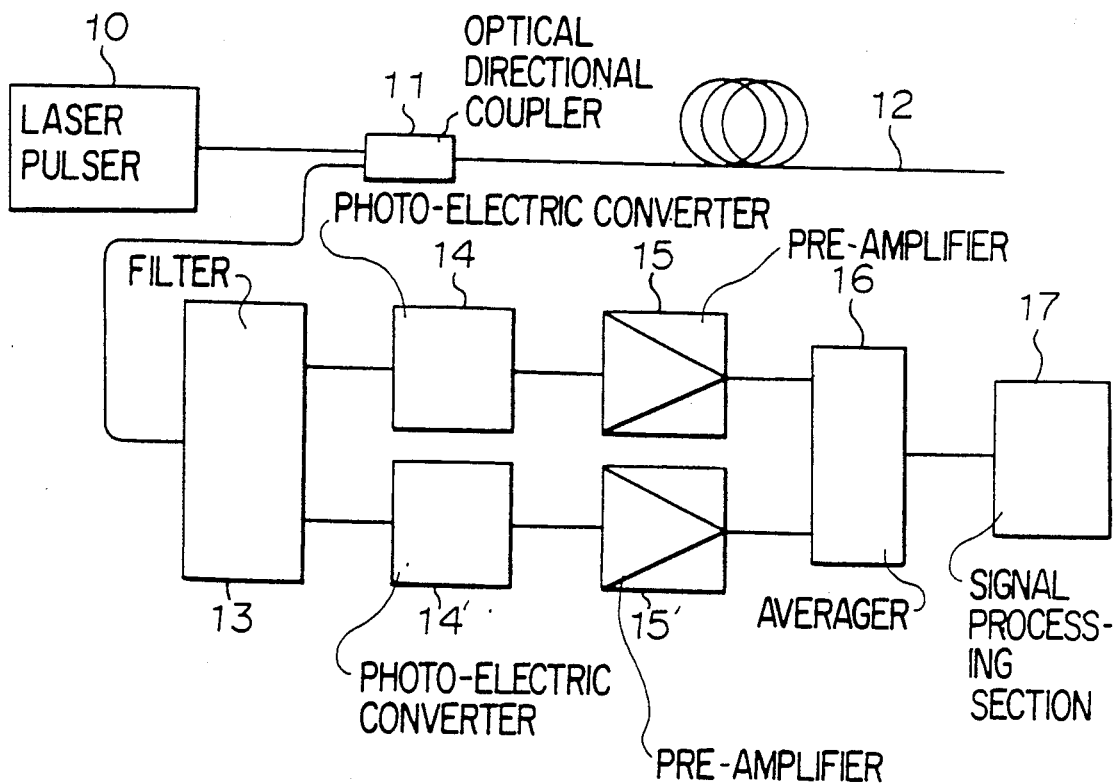
FIG. 5 is a block diagram of a conventional sensor.

Here, the sensor of the present invention is such that in the conventional apparatus as shown in FIG. 5, the treatment having the above correction factor introduced is conducted by a signal processing unit i.e., a unit comprising a filter 13, photo-electric converters 14 and 14', preamplifiers 15 and 15', an averager 16 and a signal processing section 17. More specifically, the treatment having the above correction factor introduced, is conducted by the signal processing section 17 or by a microcomputer connected to the signal processing section 17.

The results of FIGS. 1 to 3 are those obtained by the measurements wherein $\alpha$ was $0.6 \times 10^{-5}$ (m$^{-1}$), $\Theta$ was 25(°C.), R'(T) and R'($\Theta$) were empirically obtained. $k = 1.38065800 \times 10^{-23}$ J·K$^{-1}$, $h = 6.62607550 \times 10^{-34}$ J·S, $c = 2.99792458 \times 10^8$ m·s$^{-1}$, and $\nu = 440$ (cm$^{-1}$).

Further, $\nu$ may have a varied value or may be an empirically obtained real value. The adverse effect to the relative ratio of the Stokes light and the anti-Stokes light caused by the optical connection between the respective units in the sensor system of the present invention, may be corrected by subjecting the signal processing unit to off setting adjustment by means of a new correction factor $\delta$ as shown below, prior to the measurement:

$$\frac{1}{T} = \frac{1}{\Theta} - \frac{k}{hc\nu} \ln\left( \frac{R'(T)}{R'(\Theta)} e^{\mu\alpha x} + \delta \right).$$

As described in the foregoing, according to the present invention, treatment is conducted based on an equation having a correction factor introduced to the conventional Dakin equation and further a correction equation taking the temperature dependency of the attenuation difference $\alpha$ in the correction factor into consideration, is employed, whereby the conventional problem such that the entire curve of the temperature distribution substantially inclines with distance, can be solved, and the precision in the temperature measurement for a long distance can be improved.

We claim:

1. A temperature-measuring method which comprises the steps of:
    maintaining a reference point of an optical fiber at a known reference temperature;
    inputting laser pulses into an incident end of the optical fiber to be measured;
    detecting the amplitudes and delay time of the Stokes and anti-Stokes light contained in a return beam from the optical fiber; and
    measuring the temperature distribution in the fiber from a ratio of respective amplitudes of said Stokes and anti-Stokes light and said delay time of the Stokes light and the anti-Stokes light contained in said return beam from the optical fiber, wherein the temperature distribution is measured by using an equation:

$$\frac{1}{T(x)} = \frac{1}{\Theta} - \frac{k}{hc\nu} \ln\left[ \frac{R'(T)}{R'(\Theta)} \exp\left[ \int_0^x \alpha\{T(\tau)\} d\tau \right] \right]$$

where T(x) is the temperature to be measured at a measuring point, $\Theta$ is the reference temperature at a reference measuring point, R'(T) is the relative ratio of the amplitudes of the Stoke and anti-Stoke light of the return beam at the measuring point, R'($\Theta$) is the relative ratio of amplitudes of the Stoke and anti-Stoke light of the return beam at the reference temperature point, k is the Boltzmann's constant, h is the Planck's constant, c is the velocity of light, $\nu$ is the Raman shift, $\alpha$ is an attenuation difference in the optical fiber between the Stokes light and the anti-Stokes light, and x is a distance of the measuring point from the incident end of the optical fiber, wherein the attenuation difference $\alpha$ is represented by a function $\alpha\{T(\tau)\}$ which is dependent on the temperature $T(\tau)$ at the measuring point $\tau$, and the exponential function in which the exponential part is represented by a value obtained by integrating the function $\alpha\{T(\tau)\}$ with the variation $d\tau$ in distance, is employed as a correction factor.

2. The temperature-measuring method according to claim 1, wherein prior to the measurement of the temperature distribution, $\alpha$ at various temperatures is memorized by the signal processing unit.

3. A distributed optical fiber temperature sensor which comprises: means for maintaining a temperature reference point of an optical fiber at a known reference temperature, a light source which inputs laser pulses into an incident end of the optical fiber to be measured, an optical directional coupler which introduces a return beam from the optical fiber to a signal processing unit, and the signal processing unit, the signal processing unit including means for detecting the Stokes light and the anti-Stokes light contained in the return beam and means for measuring the temperature distribution in the optical fiber from the ratio of the amplitudes and the delay time of the Stokes light and the anti-Stokes light, wherein said temperature distribution is obtained by using an equation:

$$\frac{1}{T(x)} = \frac{1}{\Theta} - \frac{k}{hc\nu} \ln\left[ \frac{R'(T)}{R'(\Theta)} \exp\left[ \int_0^x \alpha\{T(\tau)\} d\tau \right] \right]$$

where T(x) is the temperature to be measured at a measuring point, $\Theta$ is the reference temperature at the reference temperature point, R'(T) is the relative ratio of amplitudes of the Stokes and anti-Stokes light at the measuring point, R'$\Theta$ is the relative ratio of amplitudes of the Stokes and anti-Stokes light at the reference temperature point, k is the Boltzmann's constant, h is the Planck's constant, c is the velocity of light, $\nu$ is the Raman shift, $\alpha$ is an attenuation difference in the optical fiber between the Stokes light and the anti-Stokes light, and x is a distance to the measuring point from the incident end of the optical fiber.

4. The distributed optical fiber temperature sensor according to claim 3, wherein prior to the measurement of the temperature distribution, $\alpha$ at various temperatures is memorized by the signal processing unit.

* * * * *